United States Patent
Smith et al.

(10) Patent No.: US 7,414,000 B2
(45) Date of Patent: Aug. 19, 2008

(54) METHOD FOR MAKING FLOAT GLASS HAVING REDUCED DEFECT DENSITY

(75) Inventors: Charlene S. Smith, Lower Burrell, PA (US); George A. Pecoraro, Lower Burrell, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 11/584,265

(22) Filed: Oct. 20, 2006

(65) Prior Publication Data

US 2007/0037688 A1    Feb. 15, 2007

Related U.S. Application Data

(62) Division of application No. 10/672,025, filed on Sep. 26, 2003, now Pat. No. 7,162,892.

(60) Provisional application No. 60/414,516, filed on Sep. 27, 2002.

(51) Int. Cl.
*C03C 3/087* (2006.01)
*C03C 3/095* (2006.01)

(52) U.S. Cl. .......................................... 501/70; 501/64

(58) Field of Classification Search ................... 501/64, 501/70, 71
See application file for complete search history.

(56) References Cited

U.S. PATENT DOCUMENTS

| | | | | |
|---|---|---|---|---|
| 2,755,212 | A * | 7/1956 | Brown | 428/441 |
| 3,083,551 | A * | 4/1963 | Pilkington | 65/32.5 |
| 3,961,930 | A * | 6/1976 | Robinson et al. | 65/99.5 |
| 4,091,156 | A * | 5/1978 | Edge et al. | 428/192 |
| 5,214,008 | A * | 5/1993 | Beckwith et al. | 501/69 |
| 5,688,727 | A * | 11/1997 | Shelestak et al. | 501/71 |
| 5,830,812 | A * | 11/1998 | Shelestak et al. | 501/71 |
| 6,313,053 | B1 * | 11/2001 | Shelestak | 501/71 |
| 6,673,730 | B1 * | 1/2004 | Shelestak | 501/71 |

FOREIGN PATENT DOCUMENTS

| | | | |
|---|---|---|---|
| CN | 1277161 A | * | 12/2000 |
| EP | 1041050 A1 | * | 10/2000 |
| EP | 1055646 A1 | * | 11/2000 |

\* cited by examiner

*Primary Examiner*—Jerry Lorengo
*Assistant Examiner*—Elizabeth A Bolden
(74) *Attorney, Agent, or Firm*—Andrew C. Siminerio

(57) ABSTRACT

A method for reducing the defect density of glass comprising melting a glass composition comprising from 65-75 wt. % of $SiO_2$; from 10-20 wt. % of $Na_2O$; from 5-15 wt. % of CaO; from 0-5 wt. % of MgO; from 0-5 wt. % of $Al_2O_3$; from 0-5 wt. % of $K_2O$; from 0-2 wt. % $Fe_2O_3$; and from 0-2% FeO, wherein the glass composition has a total field strength index of greater than or equal to 1.23 is disclosed.

4 Claims, No Drawings

METHOD FOR MAKING FLOAT GLASS HAVING REDUCED DEFECT DENSITY

RELATED APPLICATIONS

This application is a divisional application of U.S. application Ser. No. 10/672,025 filed Sep. 26, 2003, in the names of Charlene S. Smith and George A. Pecoraro for "METHOD FOR MAKING FLOAT GLASS HAVING REDUCED DEFECT DENSITY" (now U.S. Pat. No. 7,162,892), which application in its entirety is herein incorporated by reference. This application claims the benefits of U.S. Provisional Application Ser. No. 60/414,516 filed Sep. 27, 2002, which application is herein incorporated by reference in its entirety.

FIELD OF THE INVENTION

The present invention relates to methods and related compositions for reducing the defect density of glass; especially methods that can be used in float glass processes including an oxy-fuel furnace.

BACKGROUND OF THE INVENTION

The production of glass by the float glass process is well known in the art. Generally, the float glass process involves mixing and heating various components of a glass composition to produce a glass melt, pouring the glass melt onto a bath of molten tin, and drawing the glass melt along the bath of molten tin to form a dimensionally stable continuous sheet of glass.

Various components are added to the glass composition to yield glass having different properties such as color, solar absorbance, strength, etc. The end use of the glass determines the specific components required in the glass composition. For example, in one instance, blue glass may be required so certain components will be used in the composition. In another instance, green glass having a specific UV absorbance may be required so different additives will be used to make up the composition.

A component present in the glass melt is water. At the stage of the float glass process when the glass melt is poured into a tin bath, some of the water diffuses out of the glass melt and dissociates into hydrogen and oxygen at the glass-tin interface. The tin, which has a very low solubility for hydrogen, is basically saturated with hydrogen from the bath atmosphere so very little extra hydrogen can be dissolved in the tin. Consequently, hydrogen from the disassociation of water gets trapped at the interface between the molten glass and tin and ultimately impinges on the bottom surface of the glass appearing as open bottom bubble defects in the bottom surface of a glass article. The open-bottom bubbles can be described as voids in the glass which generally have an inverted-U shape cross-section. The presence of open bottom bubbles increases the overall defect density of the glass.

Customers set requirements for the defect density of glass for certain applications. The standards are very difficult to meet with conventional float glass processes due to the presence of open bottom bubbles.

The present invention provides a novel method for reducing the open-bottom bubble defect density of glass produced in a float glass process, especially an oxy-fuel fired furnace.

SUMMARY OF THE INVENTION

In one embodiment, the present invention is a method for reducing the defect density of float glass comprising:

melting a glass composition comprising:
from 65-75 wt. % of $SiO_2$;
from 10-20 wt. % of $Na_2O$;
from 5-15 wt. % of CaO;
from 0-5 wt. % of MgO;
from 0-5 wt. % of $Al_2O_3$:
from 0-5 wt. % of $K_2O$:
from 0-2 wt % of FeO; and
from 0-2 wt % $Fe_2O_3$, wherein the glass composition has a total field strength index of greater than or equal to 1.23.

In another embodiment, the present invention is a glass composition comprising:
from 65-75 wt. % of $SiO_2$;
from 10-20 wt. % of $Na_2O$;
from 5-15 wt. % of CaO;
from 0-5 wt. % of MgO;
from 0-5 wt. % of $Al_2O_3$;
from 0-5 wt. % of $K_2O$;
from 0-2 wt % of FeO; and
from 0-2 wt. % $Fe_2O_3$, wherein the glass composition has a total field strength index of greater than or equal to 1.23.

DESCRIPTION OF THE INVENTION

Unless otherwise indicated, all numbers expressing dimensions, physical characteristics, quantities of ingredients, reaction conditions and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10 or 3.2 to 7.8.

The present invention is a method for reducing the defect density of glass produced via a float glass process which is well known in the art. The invention can be used in float glass processes including either an air-fuel furnace or an oxy-fuel furnace. In an oxy-fuel furnace, oxygen, not air, supports combustion. However, the invention is particularly well suited for float glass processes that include an oxy-fuel furnace.

The present invention comprises melting a glass composition comprising from 65-75 wt. % of $SiO_2$;
from 10-20 wt. % of $Na_2O$;
from 5-15 wt. % of CaO;
from 0-5 wt. % of MgO;
from 0-5 wt. % of $Al_2O_3$;
from 0-5 wt. % of $K_2O$,
from 0-2 wt % of FeO; and
from 0-2 wt % of Fe2O3.

wherein the total field strength must be greater than or equal to 1.23.

The weight percents are based on the final oxide weight of the composition. The total amount of iron present in glass can be expressed in terms of $Fe_2O_3$. However, this does not mean that all of the iron is actually in the form of $Fe_2O_3$. Similarly, the amount of iron can be reported as FeO, but this does not mean that all of the iron is actually in the form of FeO.

Additives can be included in the glass composition to attain certain color and/or solar or other performance.

Additives which can be added to the glass composition to achieve glass having a specific color are well known to those of ordinary skill in the art. Such additives include, but are not limited to, iron oxides (FeO and $Fe_2O_3$), cobalt, chromium, nickel, selenium, cerium, and/or titanium.

Other additives can be added to the glass composition to achieve glass having certain solar and other performance. These additives are well known to those of ordinary skill in the art. Such components include, but are not limited to, iron oxides, cobalt, chromium, vanadium, titanium, cerium, or any other conventional such materials.

Iron oxides can be included in a glass composition for several reasons. Ferric oxide, $Fe_2O_3$, is a good ultraviolet radiation absorber and can give glass a yellow color. Ferrous oxide, FeO, is a good infrared radiation absorber and can give glass a blue color. With a proper balance of $Fe_2O_3$ and FeO, a green glass can be made.

In order to reflect the relative amounts of ferrous and ferric iron in a glass composition, the term "redox" will be used. As used herein, redox means the amount of iron in the ferrous state (FeO) divided by the amount of total iron. The term "total iron" is expressed in terms of $Fe_2O_3$.

In a non-limiting embodiment of the invention, the glass composition comprises about 0.005 to 1.5 weight percent of total iron based on the weight percent of the composition.

CoO is a weak infrared radiation absorber and can provide a blue color to the glass. In a non-limiting embodiment of the invention, the glass composition comprises 0.0 to 500.0 ppm CoO.

$Cr_2O_3$ can provide a green color to the glass and some ultraviolet radiation absorption. In a non-limiting embodiment of the invention, the glass composition comprises 0.0 to 0.1 weight percent $Cr_2O_3$ based on the weight of the composition.

Se can provide ultraviolet and infrared radiation absorption and a pink to brown color to the glass. Se can also be used to decrease redox. In a non-limiting embodiment of the invention, the glass composition comprises 0.0 to 100.0 parts per million ("ppm") of Se.

$TiO_2$ can be used to provide ultraviolet radiation absorption and a yellow color to the glass. In a non-limiting embodiment of the invention, the glass composition comprises 0.0 to 2.0 weight percent $TiO_2$ based on the weight of the composition.

Vanadium ($V_2O_5$), can provide a yellow-green color and ultraviolet and infrared radiation absorption at different valence states. In a non-limiting embodiment of the invention, the glass composition comprises 0.0 to 0.5 weight percent of vanadium based on the total weight of the composition.

In various non-limiting embodiments, the glass composition of the present invention can include nickel, zinc oxide, erbium oxide, tin oxide, copper, manganese, neodymium, and/or molybdenum. For example, the glass composition can comprise 0.0 to 0.1 weight percent of nickel based on the total weight of the composition. For example, the glass composition can comprise 0.0 to 1.0 weight percent of zinc oxide based on the total weight of the composition. For example, the glass composition can comprise 0.0 to 3.0 weight percent of erbium oxide based on the total weight of the composition. For example, the composition can also comprise 0.0 to 2.0 weight percent of tin oxide based on the total weight of the composition. For example, the composition can comprise 0.0 to 0.5 weight percent of copper based on the total weight of the composition. For example, the composition can comprise 0.0 to 0.5 weight percent of manganese based on the total weight of the composition. For example, the composition can comprise 0.0 to 2.0 weight percent of neodymium based on the total weight of the composition. For example, the composition can comprise 0.0 to 300 ppm of molybdenum based on the total weight of the composition.

The glass composition of the present invention can also include small amounts of other materials like melting and refining aids, trace materials, impurities, etc. which are well known to one of ordinary skill in the art.

The glass composition of the present invention must have a certain total field strength (also known as the cation field strength). The total field strength of the glass composition must be greater than or equal to 1.23 or greater than or equal to 1.300. The expression for an individual cation field strength is $Z^2/r$, charge squared divided by the radius. The total field strength of the glass composition is calculated as follows: the molar fraction of only the certain oxides is calculated first. For purposes of the present application, only the following oxides are considered in the total field strength calculation: $SiO_2$, $Na_2O$, CaO, MgO, $Al_2O_3$, $K_2O$, $Fe_2O_3$, and FeO. The number of cations/molecule is then multiplied by the mole fraction and the field strength for each cation to obtain the contribution to the total field strength from each oxide. The total field strength is the sum of each oxide contribution.

The table below shows a base field strength calculation for a glass composition.

| Oxide | Amount Wt % | Molar fraction | Cation Field Strength | No. of cations/molecule | Field Strength Contribution |
|---|---|---|---|---|---|
| $SiO_2$ | 71.59 | .7104 | 1.57 | 1 | 1.115 |
| $Na_2O$ | 13.9 | .1335 | 0.19 | 2 | 0.051 |
| CaO | 7.99 | .0849 | 0.33 | 1 | 0.028 |
| MgO | 3.80 | .0561 | 0.45 | 1 | 0.025 |
| $Al_2O_3$ | 1.49 | .0087 | 0.84 | 2 | 0.015 |
| $K_2O$ | 1.00 | .0063 | 0.13 | 2 | 0.002 |
| $Fe_2O_3$ | 0.08 | .0002 | 0.85 | 2 | 0.0003 |
| FeO | 0.04 | .0003 | 0.43 | 1 | 0.0001 |
| | | | | Total Field Strength | 1.236 |

A very small change in the weight percent of the oxides used to calculate the total field strength present in a glass composition can drastically affect the total field strength of the composition. Therefore, a slight change in the composition with respect to certain oxides can cause the total field strength to fall outside of the required range for the present invention.

In a float glass process, the glass composition is poured into a tin bath after it is melted. The glass melt coming into the tin bath can contain water. The glass melt can have a water content equal to or greater than 0.035 weight percent based on the total weight percent of the composition. The water content can be measured in the lab using spectral analysis.

The glass melt is subjected to further processing as is well known in the art to produce flat glass sheets of various thicknesses. Non-limiting examples of suitable float glass processes are disclosed in U.S. Pat. Nos. 3,083,551, 3,961,930, and 4,091,156 which are all hereby incorporated by reference.

According to the present invention, glass can be produced that has reduced defect density; particularly open-bottom bubbles defects.

Defects in glass can be measured using on-line and off-line methods. An Automatic Inspection System manufactured by Inspection Technologies Inc. can be used to measure defects on-line. Defects can also be measured off-line by visual inspection. The measured defects include surface as well as internal defects. By reducing the number of open-bottom bubble defects, the invention reduces the overall defect density of glass. The defect density of glass is measured as number of defects per 100 square feet.

Glass produced according to the present invention can meet the various commercial standards for defect density. For example, car manufacturers set standards for defect density for automotive windshields. One automobile manufacturer requires an automotive windshield to have zero defects. Any piece of glass having a defect is discarded in the factory. In such a case, if the number of defects in the glass exceeds 1 per 100 Sq. ft., the float process yield becomes too low for the operation to be profitable.

The present invention also encompasses a glass composition comprising:
 from 65-75 wt. % of $SiO_2$;
 from 10-20 wt. % of $Na_2O$;
 from 5-15 wt. % of CaO;
 from 0-5 wt. % of MgO;
 from 0-5 wt. % of $Al_2O_3$;
 from 0-5 wt. % of $K_2O$;
 from 0-2 wt. % $Fe_2O_3$, and
 from 0-2 wt % FeO,
wherein the glass composition has a total field strength index of greater than or equal to 1.23.

The weight percents are based on the final weight of the composition. The composition can also include all of the additional components which are discussed above.

The method and related glass composition of the present invention can be used to form numerous glass articles such as, but not limited to, glass ribbons, laminated articles such as automotive windshields, tempered glass articles, side lights, back lights, architectural glass products, etc.

In a non-limiting embodiment of the invention, the glass article can be used to form a laminated product as is well known in the art. At least one of the pieces of glass in the laminated product can be produced according to the present invention. The laminated product can be a windshield having less than 1 total defects per 100 square feet.

EXAMPLE

The following non-limiting examples illustrate the present invention. Table 1 shows various glass compositions according to the present invention. The weight percents are based on the total weight of the composition.

TABLE 1

| Component | Glass Compositions | | | |
| --- | --- | --- | --- | --- |
| | Clear Glass #1 [wt %] | Clear Glass #2 [wt %] | Green Glass #1 [wt %] | Green Glass #2 [wt %] |
| SiO2 | 71.59 | 72.35 | 72.77 | 72.56 |
| Na2O | 13.9 | 13.8 | 13.59 | 13.4 |
| K2O | 1 | 0.71 | 0.067 | 0.078 |
| CaO | 7.99 | 7.86 | 9.58 | 9.62 |
| MgO | 3.8 | 3.88 | 3.1 | 3.02 |
| Al2O3 | 1.49 | 1.11 | 0.19 | 0.25 |
| Fe2O3 | 0.08 | 0.09 | 0.35 | 0.47 |
| FeO | 0.04 | 0.04 | 0.13 | 0.21 |
| SO3 | 0.088 | 0.117 | 0.146 | 0.119 |
| SrO | 0.007 | 0.005 | 0.006 | 0.006 |
| ZrO2 | 0.009 | 0.023 | 0.011 | 0.014 |
| Cl | 0.008 | 0.006 | 0 | 0 |
| Cr2O3 | 0.0007 | 0.0009 | 0.0007 | 0.001 |
| MnO2 | 0 | 0 | 0.0022 | 0.0026 |
| Mo | 0 | 0 | 0 | 0.0015 |
| BaO | 0 | 0 | 0.01 | 0.01 |
| TiO2 | 0 | 0 | 0.045 | 0.225 |
| CeO2 | 0 | 0 | 0 | 0 |
| SnO2 | 0 | 0 | 0 | 0 |
| Base Field Strength | 1.236 | 1.240 | 1.237 | 1.238 |

The above examples are offered only to illustrate the present invention. The scope of the present invention is defined by the following claims.

What is claimed is:

1. A float glass composition consisting essentially of:
 from 65-75 wt. % of $SiO_2$;
 from 10-20 wt. % of $Na_2O$;
 from 5-15 wt. % of CaO;
 from 0-5 wt. % of MgO;
 from 0-5 wt. % of $Al_2O_3$;
 from 0-5 wt. % of $K_2O$;
 from 0-2 wt. % $Fe_2O_3$;
 from 0-2 wt. % FeO;
 from 0.0 to 2.0 wt. % $TiO_2$; and
 from 0.0 to 2.0 wt. % neodymium,
wherein the glass composition has a total field strength index of greater than or equal to 1.23.

2. A float glass article, comprising:
 a glass article having a glass composition consisting essentially of:
  from 65-75 wt. % of $SiO_2$;
  from 10-20 wt. % of $Na_2O$;
  from 5-15 wt. % of CaO;
  from 0-5 wt. % of MgO;
  from 0-5 wt. % of $Al_2O_3$;
  from 0-5 wt. % of $K_2O$;
  from 0-2 wt. % $Fe_2O_3$;
  from 0-2% FeO;
  from 0.0 to 2.0 wt. % $TiO_2$; and
  from 0.0 to 2.0 wt. % neodymium,
wherein the glass composition has a total field strength index of greater than or equal to 1.23.

3. A float glass article according to claim 2 wherein the article comprises at least one piece of glass in a laminated product, the article contains greater than 1 total defect per 100 square feet.

4. A float glass article according to claim 3 wherein the laminated product is a windshield.

* * * * *